(12) United States Patent
Bloch et al.

(10) Patent No.: US 10,284,383 B2
(45) Date of Patent: May 7, 2019

(54) AGGREGATION PROTOCOL

(71) Applicant: Mellanox Technologies Ltd., Yokneam (IL)

(72) Inventors: Gil Bloch, Zichron Yaakov (IL); Diego Crupnicoff, Buenos Aires (AR); Benny Koren, Zichron Yaakov (IL); Oded Wertheim, Zichron Yaakov (IL); Lion Levi, Yavneh (IL); Richard Graham, Knoxville, TN (US); Michael Kagan, Zichron Yaakov (IL)

(73) Assignee: Mellanox Technologies, Ltd., Yokneam (IL)

( * ) Notice: Subject to any disclaimer, the term of this patent is extended or adjusted under 35 U.S.C. 154(b) by 79 days.

(21) Appl. No.: 15/250,953

(22) Filed: Aug. 30, 2016

(65) Prior Publication Data

US 2017/0063613 A1    Mar. 2, 2017

Related U.S. Application Data

(60) Provisional application No. 62/211,885, filed on Aug. 31, 2015.

(51) Int. Cl.
*H04L 12/24* (2006.01)
*H04L 12/18* (2006.01)
*H04L 12/44* (2006.01)

(52) U.S. Cl.
CPC ............ *H04L 12/185* (2013.01); *H04L 12/44* (2013.01); *H04L 41/12* (2013.01)

(58) Field of Classification Search
CPC ..... H04L 41/083; H04L 12/185; H04L 12/44; H04L 41/0856; H04L 41/12
See application file for complete search history.

(56) References Cited

U.S. PATENT DOCUMENTS

| | | | |
|---|---|---|---|
| 4,933,969 A | 6/1990 | Marshall et al. | |
| 5,068,877 A | 11/1991 | Near et al. | |
| 5,325,500 A | 6/1994 | Bell et al. | |
| 5,353,412 A | * 10/1994 | Douglas ............ | G06F 15/17381 370/408 |

(Continued)

OTHER PUBLICATIONS

U.S. Appl. No. 14/937,907 Office Action dated Jun. 19, 2017.

(Continued)

*Primary Examiner* — Wutchung Chu
(74) *Attorney, Agent, or Firm* — Kligler & Associates

(57) ABSTRACT

A switch in a data network is configured to mediate data exchanges among network elements. The apparatus further includes a processor, which organizes the network elements into a hierarchical tree having a root node network element, vertex node network elements, and child node network elements that include leaf node network elements. The leaf node network elements are originate aggregation data and transmit the aggregation data to respective parent vertex node network elements. The vertex node network elements combine the aggregation data from at least a portion of the child node network elements, and transmit the combined aggregation data from the vertex node network elements to parent vertex node network elements. The root node network element is operative for initiating a reduction operation on the aggregation data.

20 Claims, 4 Drawing Sheets

(56) References Cited

U.S. PATENT DOCUMENTS

| | | | |
|---|---|---|---|
| 5,404,565 A * | 4/1995 | Gould | G06F 15/17381 370/406 |
| 5,606,703 A | 2/1997 | Brady et al. | |
| 6,041,049 A | 3/2000 | Brady | |
| 6,507,562 B1 * | 1/2003 | Kadansky | H04L 12/1877 370/216 |
| 6,857,004 B1 | 2/2005 | Howard et al. | |
| 6,937,576 B1 * | 8/2005 | Di Benedetto | H04L 12/462 370/256 |
| 7,102,998 B1 * | 9/2006 | Golestani | H04L 47/10 370/235 |
| 7,124,180 B1 * | 10/2006 | Ranous | H04L 12/4633 709/224 |
| 7,171,484 B1 | 1/2007 | Krause et al. | |
| 7,555,549 B1 | 6/2009 | Campbell et al. | |
| 7,613,774 B1 | 11/2009 | Caronni et al. | |
| 8,213,315 B2 | 7/2012 | Crupnicoff et al. | |
| 8,761,189 B2 | 6/2014 | Shachar et al. | |
| 8,811,417 B2 | 8/2014 | Bloch et al. | |
| 9,110,860 B2 | 8/2015 | Shahar | |
| 9,344,490 B2 | 5/2016 | Bloch et al. | |
| 9,563,426 B1 | 2/2017 | Bent et al. | |
| 2002/0010844 A1 | 1/2002 | Noel et al. | |
| 2002/0035625 A1 * | 3/2002 | Tanaka | H04L 41/0856 709/223 |
| 2002/0150094 A1 * | 10/2002 | Cheng | H04L 12/185 370/389 |
| 2002/0150106 A1 | 10/2002 | Kagan et al. | |
| 2002/0152315 A1 | 10/2002 | Kagan et al. | |
| 2002/0152327 A1 | 10/2002 | Kagan et al. | |
| 2002/0152328 A1 | 10/2002 | Kagan et al. | |
| 2003/0018828 A1 | 1/2003 | Craddock et al. | |
| 2003/0061417 A1 | 3/2003 | Craddock et al. | |
| 2003/0065856 A1 | 4/2003 | Kagan et al. | |
| 2004/0062258 A1 | 4/2004 | Grow et al. | |
| 2004/0078493 A1 | 4/2004 | Blumrich et al. | |
| 2004/0120331 A1 | 6/2004 | Rhine et al. | |
| 2004/0123071 A1 | 6/2004 | Stefan et al. | |
| 2004/0252685 A1 | 12/2004 | Kagan et al. | |
| 2005/0097300 A1 | 5/2005 | Gildea et al. | |
| 2005/0122329 A1 | 6/2005 | Janus | |
| 2005/0129039 A1 | 6/2005 | Biran et al. | |
| 2005/0131865 A1 | 6/2005 | Jones et al. | |
| 2008/0126564 A1 | 5/2008 | Wilkinson | |
| 2008/0168471 A1 | 7/2008 | Benner et al. | |
| 2008/0288949 A1 | 11/2008 | Bohra et al. | |
| 2009/0037377 A1 * | 2/2009 | Archer | G06F 17/30445 |
| 2009/0063816 A1 | 3/2009 | Arimilli et al. | |
| 2009/0182814 A1 | 7/2009 | Tapolcai et al. | |
| 2009/0247241 A1 | 10/2009 | Gollnick et al. | |
| 2009/0292905 A1 * | 11/2009 | Faraj | G06F 9/5061 712/225 |
| 2010/0049836 A1 | 2/2010 | Kramer | |
| 2010/0074098 A1 * | 3/2010 | Zeng | H04L 12/44 370/217 |
| 2011/0258245 A1 * | 10/2011 | Blocksome | G06F 15/17318 709/201 |
| 2012/0063436 A1 * | 3/2012 | Thubert | H04L 45/04 370/338 |
| 2012/0117331 A1 | 5/2012 | Krause et al. | |
| 2013/0159410 A1 * | 6/2013 | Lee | H04L 12/184 709/204 |
| 2015/0269116 A1 | 9/2015 | Raikin et al. | |
| 2016/0299872 A1 * | 10/2016 | Vaidyanathan | G06F 15/7871 |

OTHER PUBLICATIONS

Mellanox Technologies, "InfiniScale IV: 36-port 40GB/s Infiniband Switch Device", 2 pages, 2009.

Mellanox Technologies Inc., "Scaling 10Gb/s Clustering at Wire-Speed", 8 pages, 2006.

IEEE 802.1D Standard "IEEE Standard for Local and Metropolitan Area Networks—Media Access Control (MAC) Bridges", IEEE Computer Society, 281 pages, Jun. 9, 2004.

IEEE 802.1AX Standard "IEEE Standard for Local and Metropolitan Area Networks—Link Aggregation", IEEE Computer Society, 163 pages, Nov. 3, 2008.

Turner et al., "Multirate Clos Networks", IEEE Communications Magazine, 11 pages, Oct. 2003.

Thayer School of Engineering, "An Slightly Edited Local Copy of Elements of Lectures 4 and 5", Dartmouth College, 5 pages, Jan. 15, 1998 http://people.seas.harvard.edu/~jones/cscie129/nu_lectures/lecture11/switching/clos_network/clos_network.html.

"MPI: A Message-Passing Interface Standard," Message Passing Interface Forum, version 3.1, 868 pages, Jun. 4, 2015.

Coti et al., "MPI Applications on Grids: a Topology Aware Approach," Proceedings of the 15th International European Conference on Parallel and Distributed Computing (EuroPar'09), 12 pages, Aug. 2009.

Petrini et al., "The Quadrics Network (QsNet): High-Performance Clustering Technology," Proceedings of the 9th IEEE Symposium on Hot Interconnects (HotI'01), 6 pages, Aug. 2001.

Sancho et al., "Efficient Offloading of Collective Communications in Large-Scale Systems," Proceedings of the 2007 IEEE International Conference on Cluster Computing, 10 pages, Sep. 17-20, 2007.

Infiniband Trade Association, "InfiniBand™ Architecture Specification", release 1.2.1, 1727 pages, Jan. 2008.

U.S. Appl. No. 15/446,004 office action dated Feb. 6, 2019.

* cited by examiner

AGGREGATION PROTOCOL

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This Application claims the benefit of U.S. Provisional Application No. 62/211,885, filed 31 Aug. 2015, which is herein incorporated by reference.

BACKGROUND OF THE INVENTION

1. Field of the Invention

This invention relates to electrical digital data processing. More particularly, this invention relates to protocols for transmission and synchronization of digital data across a network.

2. Description of the Related Art

The meanings of certain acronyms and abbreviations used herein are given in Table 1.

TABLE 1

Acronyms and Abbreviations

| | |
|---|---|
| ALU | Arithmetic Logical Unit |
| ASIC | Application Specific Integrated Circuit |
| CPU | Central Processing Unit |
| EDR | Enhanced Data Rate |
| GDC | Group Database Cache |
| HCA | Host Channel Adapter |
| HPC | High Performance Computing |
| MPI | Message Passing Interface |
| OOC | Outstanding Operation Context |
| OOT | Outstanding Operation Table |
| RCQP | Reliable Connected Queue Pair |
| RDMA | Remote Direct Memory Access |
| RoCE | RDMA over Converged Ethernet |
| SHArP | Scalable Hierarchical Aggregation Protocol |
| UD | Unreliable Datagram |

Modern computing and storage infrastructure use distributed systems to increase scalability and performance. Common uses for such distributed systems include: datacenter applications, distributed storage systems, and HPC clusters running parallel applications While HPC and datacenter applications use different methods to implement distributed systems, both perform parallel computation on a large number of networked compute nodes with aggregation of partial results or from the nodes into a global result.

Many datacenter applications such as search and query processing, deep learning, graph and stream processing typically follow a partition-aggregation pattern. An example is the well-known MapReduce programming model for processing problems in parallel across huge datasets using a large number of computers arranged in a grid or cluster. In the partition phase, tasks and data sets are partitioned across compute nodes that process data locally (potentially taking advantage of locality of data to generate partial results. The partition phase is followed by the aggregation phase where the partial results are collected and aggregated to obtain a final result. The data aggregation phase in many cases creates a bottleneck on the network due to many-to-one or many-to-few types of traffic, i.e., many nodes communicating with one node or a few nodes or controllers.

For example, in large public datacenters analysis traces show that up to 46% of the datacenter traffic is generated during the aggregation phase, and network time can account for more than 30% of transaction execution time. In some cases network time accounts for more than 70% of the execution time.

Collective communication is a term used to describe communication patterns in which all members of a group of communication end-points participate. For example, in case of Message Passing interface (MPI) the communication end-points are MPI processes and the groups associated with the collective operation are described by the local and remote groups associated with the MPI communicator.

Many types of collective operations occur in HPC communication protocols, and more specifically in MPI and SHMEM (OpenSHMEM). The MPI standard defines blocking and non-blocking forms of barrier synchronization, broadcast, gather, scatter, gather-to-all, all-to-all gather/scatter, reduction, reduce-scatter, and scan. A single operation type, such as gather, may have several different variants, such as scatter and scatterv, which differ in such things as the relative amount of data each end-point receives or the MPI data-type associated with data of each MPI rank, i.e., the sequential number of the processes within a job or group.

The OpenSHMEM specification (available on the Internet from the OpenSHMEM website) contains a communications library that uses one-sided communication and utilizes a partitioned global address space. The library includes such operations as blocking barrier synchronization, broadcast, collect, and reduction forms of collective operations.

The performance of collective operations for applications that use such functions is often critical to the overall performance of these applications, as they limit performance and scalability. This comes about because all communication end-points implicitly interact with each other with serialized data exchange taking place between end-points. The specific communication and computation details of such operations depend on the type of collective operation, as does the scaling of these algorithms. Additionally, the explicit coupling between communication end-points tends to magnify the effects of system noise on the parallel applications using these, by delaying one or more data exchanges, resulting in further challenges to application scalability.

Previous attempts to mitigate the traffic bottleneck include installing faster networks and implementing congestion control mechanisms. Other optimizations have focused on changes at the nodes or endpoints, e.g., HCA enhancements and host-based software changes. While these schemes enable more efficient and faster execution, they do not reduce the amount of data transferred and thus are limited.

SUMMARY OF THE INVENTION

A scalable hierarchical aggregation protocol implements in-network hierarchical aggregation, in which aggregation nodes (switches and routers) residing in the network fabric perform hierarchical aggregation to efficiently aggregate data from a large number of servers, without traversing the network multiple times. The protocol avoids congestion caused by incast, when many nodes send data to a single node.

Embodiments of the invention provide an efficient hardware implementation integrated into logic circuits of network switches, thus providing high performance and efficiency. The protocol advantageously employs reliable transport such as RoCE and InfiniBand transport (or any other transport assuring reliable transmission of packets) to support aggregation. The implementation of the aggregation protocol is network topology-agnostic, and produces repeatable results for non-commutative operations, e.g., floating point ADD operations, regardless of the request order of arrival. Aggregation result delivery is efficient and reliable, and group creation is supported.

Embodiments of the present invention involve modifications in switch hardware and software. The protocol can be efficiently realized by incorporating an aggregation unit and floating point ALU into a network switch ASIC. The changes improve the performance of selected collective operations by processing the data as it traverses the network, eliminating the need to send data multiple times between end-points. This decreases the amount of data traversing the network as aggregation nodes are reached. In one aspect of the invention collective communication algorithms are implemented in the network, thereby freeing up CPU resources for computation, rather than using them to process communication.

The modified switches support performance-critical barrier and collective operations involving reduction of data sets, for example reduction in the number of columns of a table. The modifications in the switches enable the development of collective protocols for frequently-used types of collective operations, while avoiding a large increase in switch hardware resources, e.g., die size. For a given application-to-system mapping, the reduction operations are reproducible, and support all but the product reduction operation applied to vectors, and also support data types commonly used by MPI and OpenSHMEM applications. Multiple applications sharing common network resources are supported, optionally employing caching mechanisms of management objects. As a further optimization, hardware multicast may distribute the results, with a reliability protocol to handle dropped multicast packets. In a practical system, based on Mellanox Switch-1B2 InfiniBand switches connecting 10,000 end nodes in a three-level fat-tree topology, the network portion of a reduction operation can be completed in less than three microseconds.

According to disclosed embodiments of the invention, a mechanism, referred to herein as the "Scalable Hierarchical Aggregation Protocol" (SHArP) is provided to perform aggregation in a data network efficiently. This mechanism reduces the amount of traffic in a scalable manner, regardless of the network bandwidth.

There is provided according to embodiments of the invention a method, which is carried out by organizing an aggregation collective group of network elements of a data network into a hierarchical tree having a root node network element, vertex node network elements and child node network elements. The child node network elements include leaf node network elements. The method is further carried out by originating aggregation data in the leaf node network elements, and iteratively performing the steps of:

receiving the aggregation data from the child node network elements in respective parent vertex node network elements thereof; in the vertex node network elements combining the received aggregation data from at least a portion of the child node network elements; and transmitting the combined received aggregation data from the vertex node network elements to parent vertex node network elements thereof; and in the root node network element initiating a reduction operation on the aggregation data.

According to one aspect of the method, organizing an aggregation collective group of network elements includes conforming a mapping of the hierarchical tree to a topology of the data network.

A further aspect of the method includes updating a database of outstanding aggregation operations in the vertex node network elements.

According to an additional aspect of the method, the database includes a status of pending aggregation requests in the child node network elements of the vertex node network elements.

According to yet another aspect of the method, combining the received aggregation data is performed on all the child node network elements of the vertex node network elements.

According to still another aspect of the method, combining the received aggregation data is performed on fewer than all the child node network elements of the vertex node network elements and transmitting the combined received aggregation data includes transmitting combined partial aggregation data to the parent vertex node network elements.

Another aspect of the method includes distributing an aggregation result from the root node network element of the hierarchical tree to all the network elements of the aggregation collective group.

According to one aspect of the method, distributing is performed by head-end replication using a reliable transport protocol.

According to a further aspect of the method, distributing is performed by a reliable multicast protocol.

There is further provided according to embodiments of the invention an apparatus, including a switch interconnected in a data network with a plurality of network elements, the switch is configured to mediate data exchanges among the network elements. The apparatus further includes a processor, which operative for organizing the network elements into at least one hierarchical tree having a root node network element, vertex node network elements and child node network elements. The child node network elements include leaf node network elements. The leaf node network elements are operative for originating aggregation data and transmitting the aggregation data to respective parent vertex node network elements thereof. The vertex node network elements are operative for combining the aggregation data from at least a portion of the child node network elements thereof, and transmitting the combined received aggregation data from the vertex node network elements to parent vertex node network elements thereof, and the root node network element is operative for initiating a reduction operation on the aggregation data.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Overview.

Figure 1:
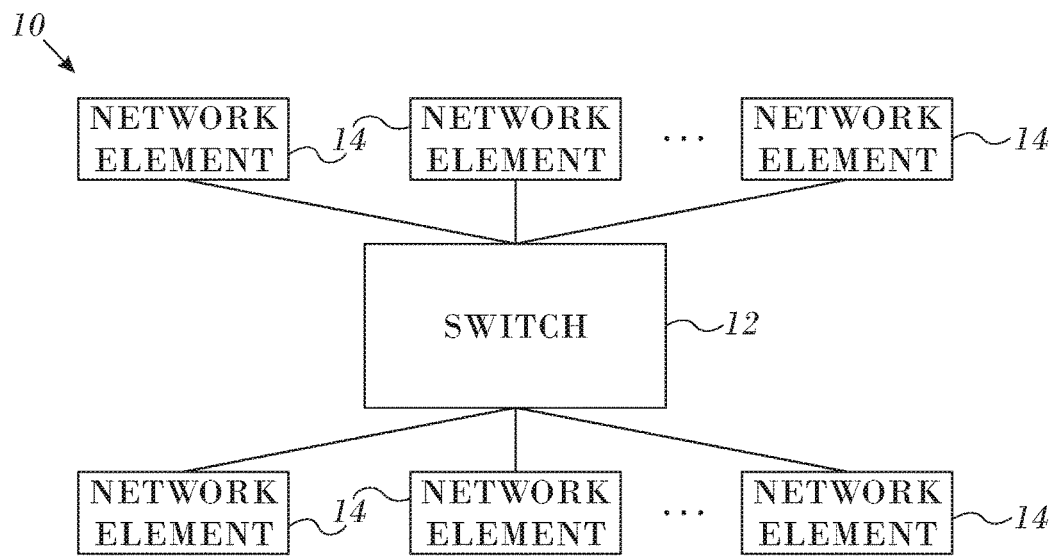
FIG. 1 is a composite schematic diagram illustrating topological and functional aspects of a portion of a data network in accordance with an embodiment of the invention.

Reference is now made to FIG. 1, which is a composite schematic diagram illustrating a portion of a data network 10 in accordance with an embodiment of the invention. The network 10 may have any topology besides the arrangement shown in FIG. 1. A switch 12 interconnects any number of network elements 14 or nodes. Exchange of data and data reduction among the network elements 14 are mediated by the switch, using various algorithms to implement data reduction.

In a first phase of a two-phase operation, network elements are organized into hierarchical data objects referred to herein as "SHArP reduction trees" or "SHArP trees" that describe available data reduction topologies and collective groups. The leaves of a SHArP tree represent the data sources, and the interior junctions (vertices) represent aggregation nodes, with one of the vertex nodes being the root. Then, in a second phase, a result of a reduction operation is sent from the root to appropriate destinations.

Mapping a well-balanced reduction tree with many nodes onto an arbitrary physical topology includes finding an efficient mapping of a logical tree to a physical tree, and distributing portions of the description to various hardware and software system components. For general purpose systems that support running simultaneous parallel jobs, perhaps sharing node resources, one needs to minimize the overlap of network resources used by the jobs, thus minimizing the impact of one running job on another. In addition, it is desirable to maximize system resource utilization. In one way of reducing the impact of such setup operations on overall job execution time, a set of SHArP trees is created in advance for use by various jobs, whether the jobs execute sequentially or concurrently. Different jobs may share the same SHArP tree concurrently.

Individualized trees used for collective operations are set up for each concurrently executing job. The information required to define the collective groups is already known, because it was required in order to define the SHArP trees. Consequently, a group can be rapidly created by pruning the SHArP trees. The assumption is that collective groups are relatively long lived objects, and are therefore constructed once and used with each collective operation. This maps well to MPI and SHMEM use cases.

SHArP Tree Description.

Figure 2:
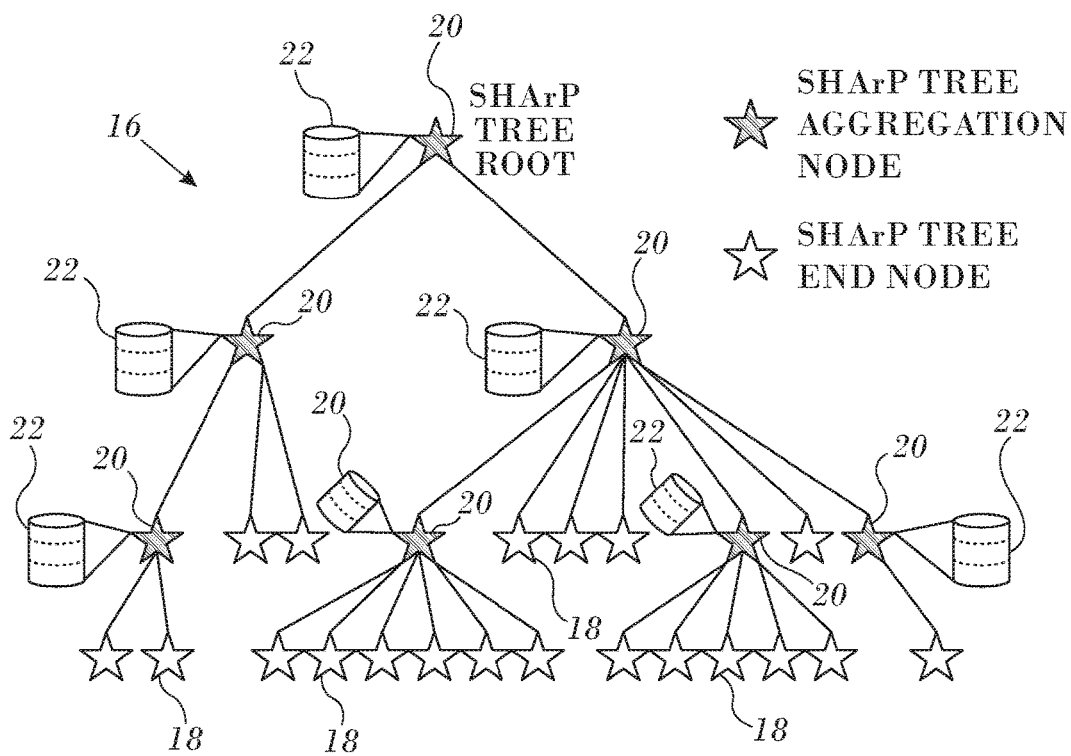
FIG. 2 is an exemplary SHArP tree in accordance with an embodiment of the invention.

A SHArP tree represents a reduction-tree. It is a general purpose construct used for describing a scalable aggregation protocol, applicable to multiple use case scenarios. Reference is now made to FIG. 2, which is an exemplary SHArP tree 16 in accordance with an embodiment of the invention. The SHArP tree 16 is composed of leaves representing data sources, internal nodes representing aggregation nodes, with the edges entering the junction representing the association of the children with the parent node. The SHArP tree 16 of FIG. 2 has 14 end nodes 18 (also referred to herein as "leaf nodes") that are connected through five aggregation nodes 20.

SHArP trees are long-lived objects, instantiated when the network is configured, and reconfigured with changes to the network. An implementation can support multiple SHArP trees within a single subnet. Setting up reduction trees that map well onto an arbitrary underlying network topology is costly, both in terms of setting up the mappings, and in distributing the mapping over the full system. Therefore, such setup is typically infrequent. Reduction trees, by their nature are terminated at a single point (their root in the network), and might span a portion of the network or the entire network.

In order to utilize available network resources well, and to minimize the effects of concurrently executing jobs on one another, one can define several reduction trees and at job initialization select the best matching tree to use. The SHArP trees are created and managed by a centralized aggregation manager. The aggregation manager is responsible for setting up SHArP trees at network initialization and configuration time and normally the trees are updated only in a case of topology change. While SHArP trees should be constructed in a scalable and efficient manner, they are not considered to be in an application performance critical path, i.e., a dependency graph that can be drawn for all the critical resources required by the application. Algorithmic details of tree construction are known and are outside the scope of this disclosure.

Each of the aggregation nodes 20 implements a tree database 22 supporting at least a single entry. The database 22 is used to look up tree configuration parameters to be used in processing specific reduction operations. The parameters are described in further detail below. In order to reduce latency and improve performance, each of the aggregation nodes 20 has its own copy of the database 22.

Each aggregation node 20 has its own context, comprising local information that describes the SHArP tree connectivity including: its parent aggregation node and a list of its child nodes, both child aggregation nodes 20 and end nodes 18. The local information includes an order of calculation in order to ensure reproducible results when identical operations are performed.

Aggregation Group.

An aggregation collective group describes a physical correspondence of vertices and leaves with aggregation nodes that are associated with a given reduction operation. Network resources are associated with aggregation groups.

For example, the leaves of a collective group may be mapped to an MPI communicator, with the rest of the elements being mapped to switches.

Transport.

Continuing to refer to FIG. 2, specific reduction operations apply to data sources on a subset of the system nodes, i.e., end nodes 18. Therefore for each such reduction operation a subset of the SHArP tree 16 that includes these end-nodes needs to be created. For performance reasons, mapping of the physical resources that are required for the reduction operation is expected to follow the network's physical topology. Although not required, such mapping facilitates efficient use of physical link bandwidth and using the most compact tree for linking the leaves to the root, thus optimizing resource utilization.

The SHArP reduction abstraction assumes reliable transport between nodes in the tree. The Reliable Connected transport and dynamically connected transports described in commonly assigned application Ser. No. 14/665,043, U.S. Patent Application Publication No. 201110116512 and U.S. Pat. No. 8,761,189 are suitable transport services for supporting communication when instantiating these over RoCE or InfiniBand networks. There are many reliable protocols which can also be employed, mutatis mutandis, in order to achieve the benefits of the invention. The SHArP reduction abstraction is built on top of the underlying transport, and does not affect the underlying transport. Software controls the service level used for the aggregation protocol traffic when using the underlying InfiniBand network. Thus, a different service level can be selected for the reduction traffic if desired.

Figure 3:
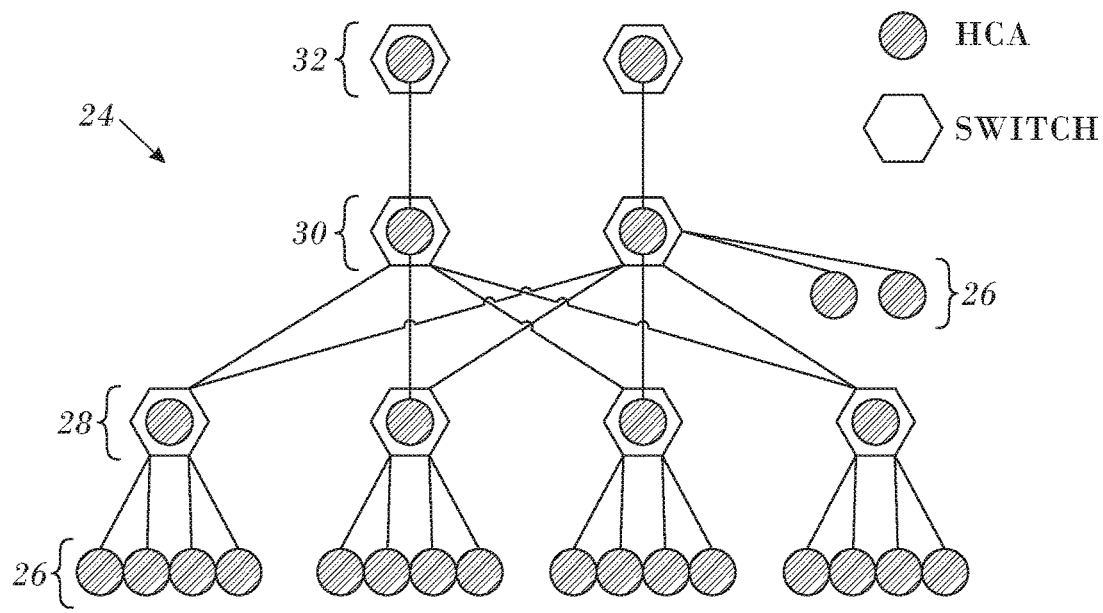
FIG. 3 is a schematic diagram of a physical network in accordance with an embodiment of the invention.

Reference is now made to FIG. 3, which is a schematic diagram of a physical network 24 consisting of hosts 26 connected through multiple layers of switches 28, 30, 32 in accordance with an embodiment of the invention. Both the hosts 26 and the switches 28, 30, 32 typically have Infini-Band HCAs, which are used to run the aggregation protocol.

Figure 4:
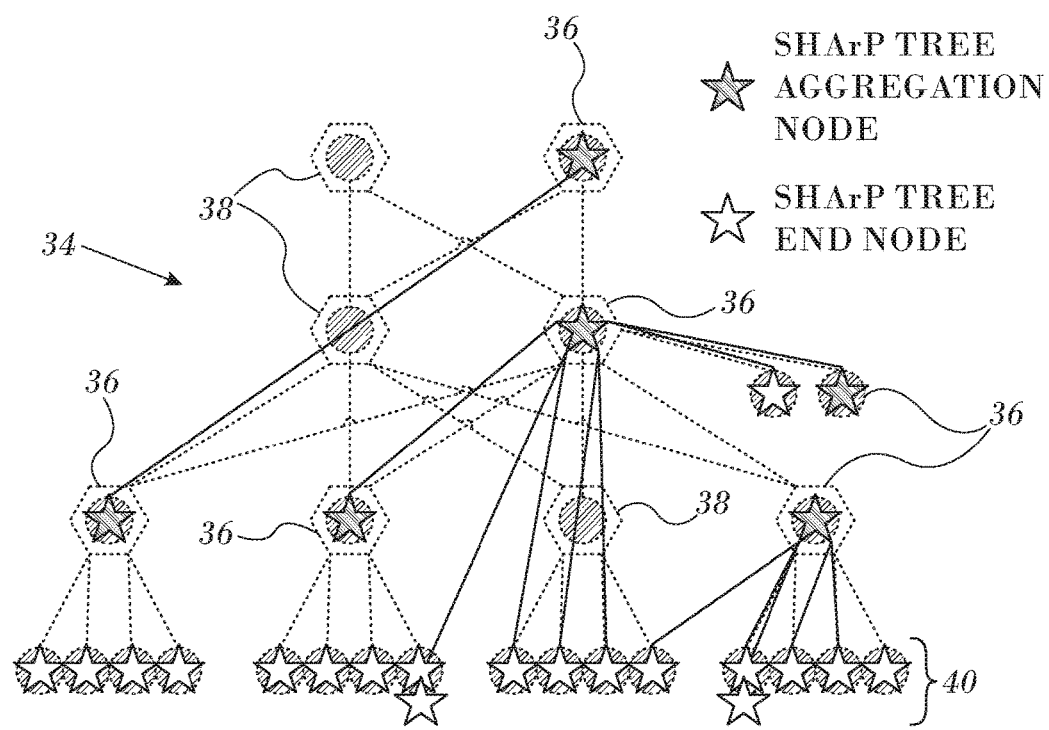
FIG. 4 is a diagram of a physical network on which a collective group of aggregation nodes has been mapped onto a SHArP tree in accordance with an embodiment of the invention.

Reference is now made to FIG. 4, which is a diagram of a physical network 34 similar to the network 24 (FIG. 3) on which a collective group of aggregation nodes has been mapped onto a SHArP tree in accordance with an embodiment of the invention. Six switches in the collective group are designated by icons 36, and are implemented as processes in an embedded host channel adapter. Three switches 38 are not included in the collective group and are transparent to the operation of the SHArP tree. The SHArP tree also includes end nodes, whose memberships in the collective group are indicated by icons 40. As noted above, the logical SHArP tree mirrors the topology of the network 34 to enhance performance.

Aggregation Group Database.

Theoretically, there is no technical reason to limit the number of instances of SHArP trees defined for a given system instance. However, practical resource constraints dictate capping their number to limit implementation costs, e.g., to minimize real estate on the switches. Indeed, well thought out definitions of collective groups largely eliminate the need for large numbers of trees, the trade-off being a relatively large number of collective groups. In such case only a limited number of trees are needed, mostly for load balancing of aggregation operations across multiple physical links and switches. Collective groups are application specific, and each application is expected to use multiple collective groups, mapping them onto objects like MPI Communicators.

Referring again to FIG. 2, as noted above, the aggregation nodes 20 each implement database 22, which includes a table of collective groups, known as a "collective group table", which may be implemented as a separate database. For scaling purposes, an aggregation node can implement a collective group cache holding a subset of the collective group table, while the full collective group table is maintained by a SHArP Topology Manager (not shown).

Aggregation Operations.

An aggregation operation associates an aggregation group which describes the nodes participating in the reduction with an aggregation subtree whose edges describe the data exchanges within the aggregation group. The aggregation group thus provides a template for data aggregation operations. The results of data aggregation operations are produced at the roots of reduction subtree.

An aggregation operation is initiated by end nodes 18, which send aggregation request messages to their parent aggregation nodes. Such request messages are typically responsive to user application calls, e.g., MPI Reduce, leading to a reduction or barrier operation. Upon receiving an aggregation message, an aggregation node performs the following actions:

1. Searches a table referred to as the outstanding operation table for the outstanding operation context.

2. If new (no entry found in the outstanding operation table) then the node:
   a. Searches a group database cache for group membership details.
   b. If necessary, the node allocates an entry in the outstanding operation table and buffer space for the operation.
   c. Upon failure to allocate one or more of the above resources, it frees allocated resources, discards the packet and optionally sends a "Receiver Not Ready Negative Acknowledge" (RNR NACK) to the requester.
   d. Initializes the outstanding operation table (OOT) entry, with the child node bitmap from the SHArP group cache, which is described below. The OOT entry holds the operation state (metadata), transaction information and a pointer to the data buffer location 3. Updates the aggregation result in the outstanding operation context 4. Updates child node bitmap in the outstanding operation table.

5. If no further messages from child nodes are pending, then the aggregation is complete.

6. Sends aggregation message upstream to SHArP parent node.

7. SHArP Tree Root node sends the aggregation message to a target destination.

8. Removes the current entry from the outstanding aggregation database.

In one mode of operation aggregation is performed on a "best effort" basis. Such an operation aggregates as many requests as possible, limited by the time each aggregation node waits for the requests from the child nodes of the aggregation group. In this mode a timer is set for each aggregation operation. Upon expiration of a timeout interval the aggregation node performs the following actions:

Send aggregation message upstream to SHArP parent node;

Includes error information and partial aggregation information received thus far;

3. Removes entry from outstanding aggregation database. A subsequent (delayed) aggregation message is treated as a new aggregation operation.

Figure 5:
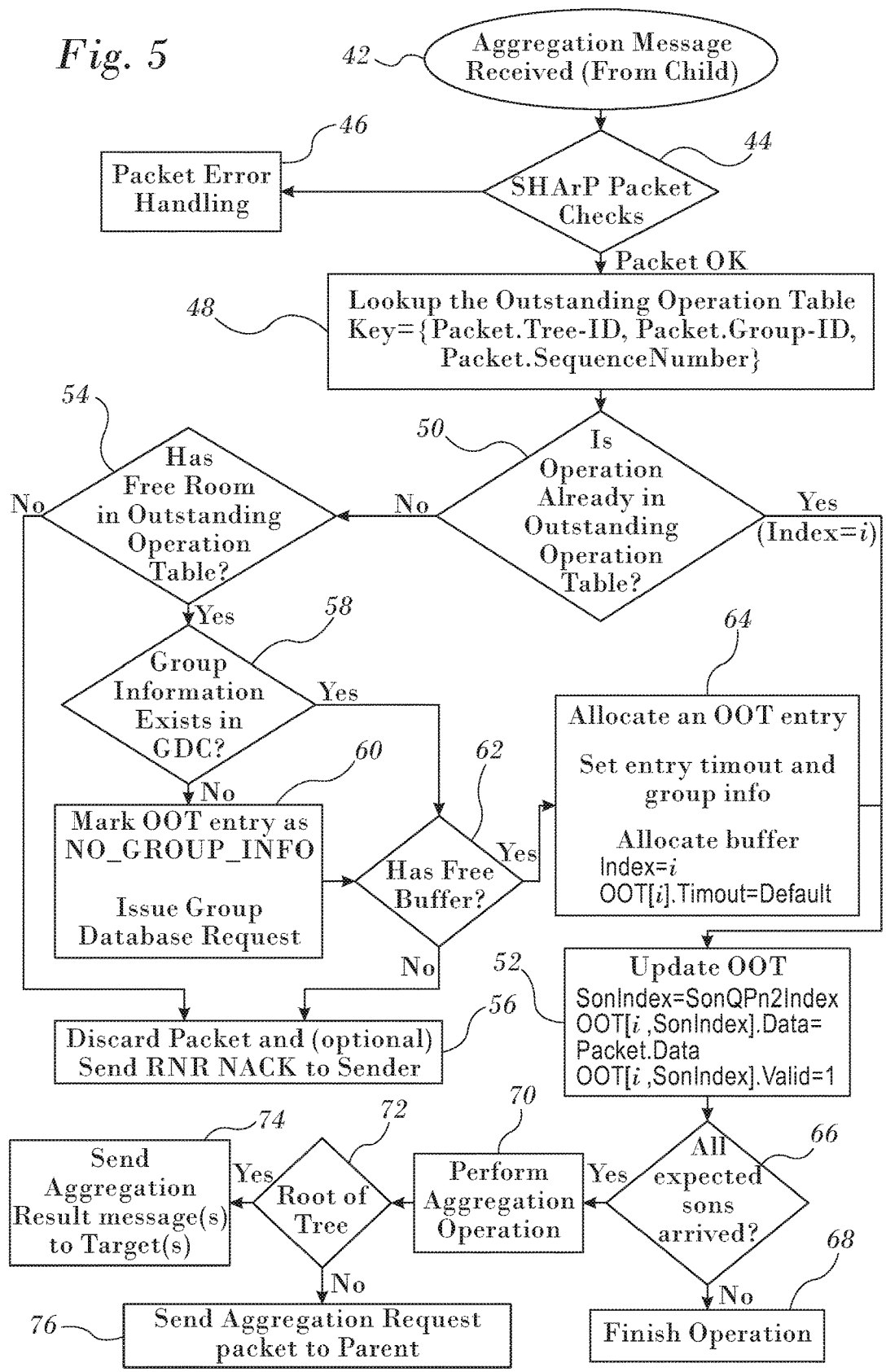
FIG. 5 is a flow chart of a method for processing aggregation request messages in a data network in accordance with an embodiment of the invention.

Reference is now made to FIG. 5, which is a flow chart of a method for processing aggregation request messages in a data network in accordance with an embodiment of the invention. The process steps are shown in a particular linear sequence in FIG. 5 for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

At initial step 42 an aggregation request message is received in an aggregation node from a child node. A search then begins for the outstanding operation context. Context information is maintained in a database, known as the outstanding operation table. It is understood that all child nodes that are members of the group are transmitting similar messages relating to the same operation, data type and vector size to the current aggregation node, and that the requests are being coordinated as described below.

At decision step 44, it is determined if a packet meets predetermined criteria. Examples of a failure to meet such criteria include a non-supported operation, or a size exceeding a supported range. If the determination at decision step 44 is negative, then control proceeds to final step 46. A packet error handling function is invoked and the procedure ends.

If the determination at decision step 44 is affirmative then control proceeds to step 48. The outstanding operation table is searched for the packet identifier, sequence number and group identifier.

Next, at decision step 50, it is determined from the table lookup in step 48 whether the operation associated with the current packet exists in the outstanding operation table. If the determination at decision step 50 is affirmative, then control proceeds to update step 52, which is described below.

If the determination at decision step 50 is negative, then control proceeds to decision step 54, where it is determined if there is space in the outstanding operation table for a new entry. If the determination at decision step 54 is negative, then control proceeds to final step 56.

If the determination at decision step 54 is affirmative, then control proceeds to decision step 58, it is determined if the group identifier of the current packet exists in the group database cache (GDC), which contains a portion of a larger number of entries in a group database. This cache is maintained for efficiency of database lookups. If the determination at decision step 58 is negative, then control proceeds to step 60 a message is transmitted to an entity holding a master database that includes all groups. The entity could be any of the hosts in the cluster, and can be implemented in software in a conventional server. The message requests inclusion of the group information for the current packet into the group database.

After performing step 60 or if the determination at decision step 58 is affirmative, then control proceeds to decision step 62, where it is determined if the group database cache has a free buffer to accommodate a new entry. If the determination at decision step 62 is negative, then control proceeds to final step 56, and the current packet is discarded.

If the determination at decision step 62 is affirmative then control proceeds to step 64. In a first operation a buffer is allocated for the information in the current packet, and in a second operation a new entry reflecting the information is made in the outstanding operation table. In the event of non-receipt of an aggregation request by one or more child nodes the operation may terminate. Alternatively a partial aggregation may be calculated. In some user applications a partial aggregation is sufficient.

After performing step 64 of if the determination at decision step 50 is affirmative an entry is available in the outstanding operation table. The outstanding operation table is updated as necessary to reflect the data in the current packet. The entry is marked as valid.

Next, at decision step 66, it is determined whether all data packets for the current aggregation operation have arrived from descendant nodes of the receiving aggregation node in the aggregation tree. If the determination at decision step 66 is negative, then control proceeds to final step 68 and the operation terminates.

If the determination at decision step 66 is affirmative then control proceeds to step 70 where the aggregation operation for the data of the received packets is performed. The details of the aggregation operation are outside the scope of this disclosure.

Next, at decision step 72, it is determined if the current aggregation node is at the root of the aggregation tree. If the determination at decision step 72 is affirmative, then control proceeds to final step 74. A message containing the result of the aggregation operation of step 70 is sent to a target destination.

If the determination at decision step 72 is negative then control proceeds to final step 76. A packet containing an aggregation request message is transmitted to the parent of the current node, which then performs its own instance of this procedure, beginning with initial step 42.

SHArP Outstanding Aggregation Context.

As noted above, the outstanding operation context is represented by the outstanding operation table, which holds one entry for each outstanding aggregation operation. The context is accessed using a tuple: Tree identifier (Tree-ID); Aggregation Group identifier (Aggregation Group-ID); and Operation Sequence Number.

Each entry is accessible to all aggregation nodes. Each aggregation node has its own copy of the outstanding operation table, so that lookups are always local. Consequently creation and removal of entries in the table may not be synchronized among the aggregation nodes. For each entry the following information is maintained:

1. Pending Sons Bitmap. This bitmap identifies child nodes of the SHArP tree in which aggregation requests are pending.
2. Aggregation Requests
3. Aggregation operation data from each child node.
4. Aggregation opcode, data type, vector size
5. Target list. This is a list of destinations that receive the results of the aggregation operation.
6. Opaque user data (64 bits), i.e., data attached to a request and received as part of a result. For example, opaque user data may include a function pointer to be applied in the result.

Aggregation Result Delivery.

An aggregation result can be sent to one or more targets. The operation request embeds the list of targets in the target address. Suitable target representations include:

1. Unicast target address using any suitable reliable transport protocol.
2. A unicast or multicast address vector using an unreliable datagram.
3. An aggregation group-based head-end replication to all group members using {Tree, Group-ID}. The tree links use a reliable transport protocol. Therefore, delivery is reliable for all group members.

Standard multicast transport, e.g., UD multicast transport for infiniBand or RoCE networks, to distribute the results to multiple destinations is very efficient, but unreliable. Standard multicast may fail to deliver the results if no result buffer is available, causing the network to drop the packet. When an aggregation request is posted, a result buffer is required to be provided, thus avoiding the failure scenario. Packets may also be dropped on rare occasions, when a data error is detected by the hardware. The error rate for the infiniBand EDR technology is about $1 \times 10^{-15}$, and a packet is expected to be dropped when such an error is encountered. Therefore, the reliability protocol is optimized for what is by far the common case, in which all multicast packets are delivered to their destination.

Figure 6:
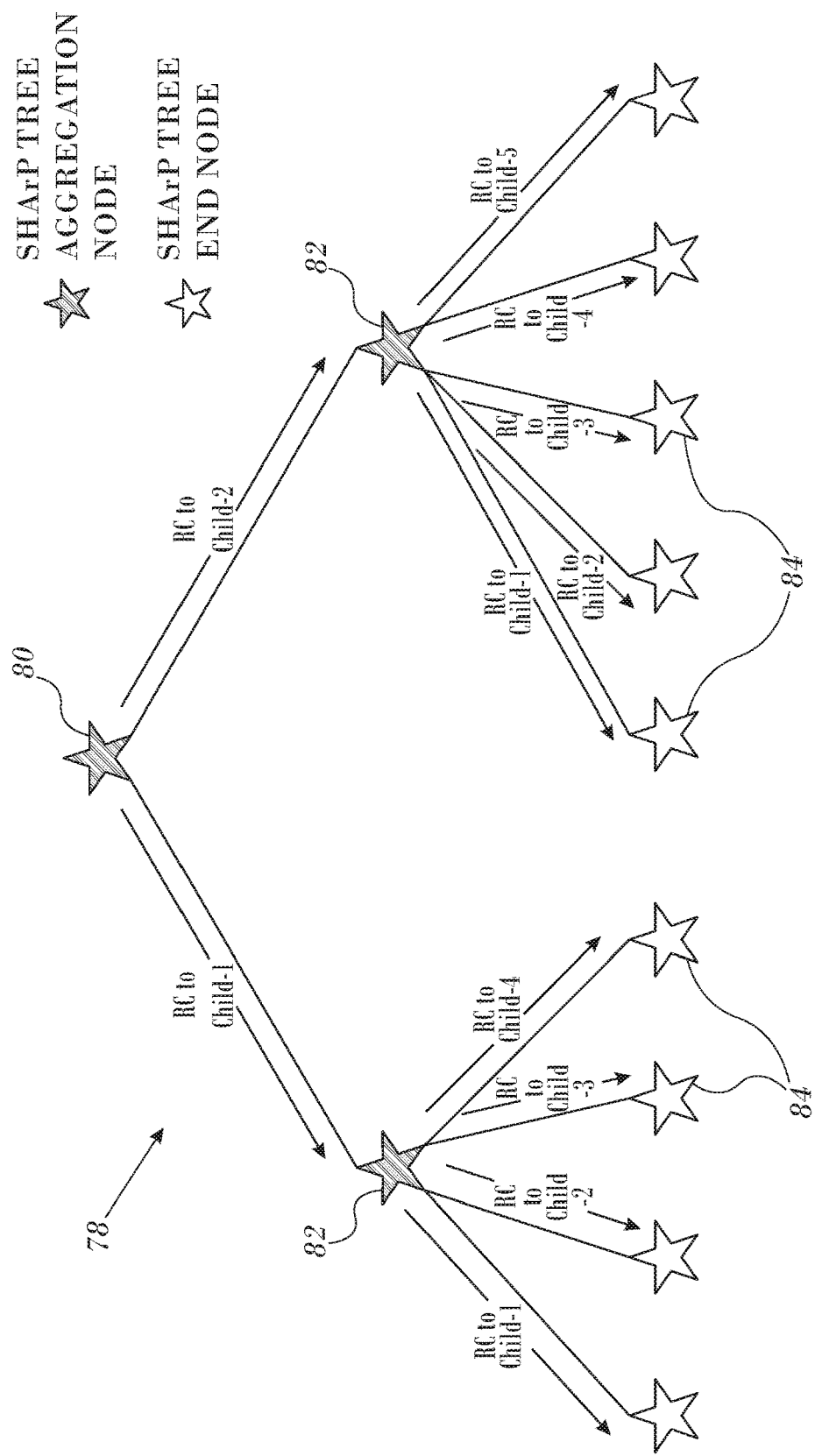
FIG. 6 depicts a SHArP tree and illustrates distribution of an aggregation result in accordance with an embodiment of the invention.

Reference is now made to FIG. 6, which depicts a SHArP tree 78 and illustrates distribution of an aggregation result in accordance with an embodiment of the invention. In addition to the multicast distribution option, the SHArP protocol enables reliable distribution of the aggregation result to the group members using head-end replication. The notation is the same as in FIG. 2.

Tree root node 80 and each of the consequent aggregation nodes 82 duplicate the result packet and send a copy to all child nodes 84 using a SHArP tree reliable transport service such as the above-noted Reliable Connected transport service. This ensures a reliable delivery of the result to all the group members.

The reliable head-end distribution may be used independently or in addition to an unreliable multicast distribution to identify lost frames, ensure distribution to all the group members and manage the SHArP resources.

Using the Reliable Connected transport service separates the SHArP reliability from the link layer and guarantees reliable delivery over any topology, including transmission through an intermediate switch.

SHArP-Based Reliable Multicast.

Continuing to refer to FIG. 6, the same mechanism can be used to reliably distribute an arbitrary payload over the SHArP protocol to all members of a group. This provides an efficient method to implement a reliable multicast service. The reliable multicast is performed by sending the data towards the group's root by sending it to the peer aggregation node over a reliable transport service, e.g., Reliable Connection. One of the peer aggregation node 82 sends it up the tree to the next aggregation node (not shown in FIG. 6) until it reaches the group's root node 80.

When the reliable multicast packet reaches the root node 80, it is distributed down the tree to all group members in a similar manner as the distribution of an aggregation operation result described above.

Using the SHArP topology for the reliable multicast distributions solves the scalability challenge of reliably sending the data from any originator towards the group root. Regardless of the number of members in the groups, or the number of groups, each end node needs to maintain only a single reliable connected (RC QP) for the reliable multicast transmission and reception.

Reliable multicast SHArP operations are sent similarly to any other SHArP operation identifying a reliable multicast operation in the SHArP header. Unlike aggregation operations, when an aggregation node receives a reliable multicast request, it immediately sends it up the tree towards the group's root.

MPI Collective Operations—Implementation.

Support for collective message passing interface operations is implemented using SHArP trees, aggregation groups and aggregation operations to produce a result, and the distribution of the result to the appropriate targets. As explained above, the leaves of the SHArP subtree correspond to the group of the collective operation, such as the local group of an MPI intracommunicator.

While there is a one-to-one mapping between an entity such as the local group of an MPI communicator and the leaves of the tree, these are not identical. The SHArP subtree leaves correspond to system nodes. When more than one MPI rank of a given group exists on a host, only one may be a member of the SHArP subtree. This is due to the limited radix of the tree at each aggregation node. A local aggregation step, prior to invoking the hardware reduction capabilities and distribution of the final result on the host might be required, as appropriate for a given collective operation.

When the network portion of a system has more than one independent network, such as in a multi-rail situation, e.g., InfiniBand arrangements having multiple ports, multiple HCAs and combinations, it is up to the communication library implementation as to how to use such networks. An implementation may schedule different collective operations for different networks, use only one of the available set of networks, or any other combination. Each of these networks has respective SHArP Trees and resource management capabilities.

SHArP-Based Barrier Operation.

The barrier operation is used to synchronize all members of a group of communication end-points, and includes no user data. In this case, the aggregation messages sent do not carry any user payload data and the aggregation nodes do not require any user data handling. Once the root node of an aggregation tree receives aggregation messages from all its child nodes, it sends a message to all the end-nodes indicating that the barrier operation is completed SHArP-Based Reduce Operation.

For reduce operations, the aggregation message should include the reduction data as well as the data type and the required reduction operation. The aggregation node performs the reduction on its local data and sends the aggregation request up the tree with the result of the local reduction. Once the root node of an aggregation tree receives aggregation messages from all its child nodes, it sends a message to all the end-nodes indicating that the reduction is completed.

To ensure repeatable results, some reduction operations must be performed in the same order regardless of the order the aggregation messages arrive at the aggregation node. To enable same order operation, the aggregation node stores the arriving aggregation requests and performs the reduction operation only when the requests are stored locally in a predefined deterministic order.

To save some space, we define pairs of child nodes for which the reduction operation will be performed once the data is available from both child nodes of the pair. These correspond to the leaves of a local reduction tree. This provides a savings of about 50% in buffer space requirements, by saving the data to the shared buffer when the first of the two buffers arrives at the aggregation unit, and immediately performs data reduction when the second input operand arrives.

A user can choose to use a non-reproducible reduction algorithm in which the operation is performed immediately on the incoming data. This provides further buffer savings, by a factor of n/2 compared to the reproducible algorithm, where n is the number of inputs.

SHArP-Based Broadcast.

For broadcast operations, the aggregation message sent by the operation root should include the data as well as the data type. The aggregation node receiving the request sends it up the tree as in a SHArP based Multicast described above. Once the root node of the aggregation tree receives the aggregation messages from all its child nodes, it sends a message to all the end-nodes with the data.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method, comprising the steps of:
organizing an aggregation collective group of network elements of a data network into a hierarchical tree having a root node network element, vertex node network elements and child node network elements, the child node network elements comprising leaf node network elements;
originating aggregation data in the leaf node network elements;
iteratively performing the steps of:
(1) receiving the aggregation data from at least a portion of the child node network elements of respective parent vertex node network elements thereof; and
(2) in the vertex node network elements combining the received aggregation data from at least a portion of the child node network elements thereof; and
(3) transmitting the combined received aggregation data from the vertex node network elements to parent vertex node network elements thereof; and
in the root node network element initiating, when all expected aggregation data have been received thereat, a reduction operation on the aggregation data to produce an aggregation result,
wherein organizing an aggregation collective group comprises defining multiple aggregation collective groups, and thereafter performing the additional steps of:
initializing a job that requires resources of the data network; and
selecting a best matching one of the multiple aggregation collective groups for the job.

2. The method according to claim 1, wherein organizing an aggregation collective group of network elements comprises conforming a mapping of the hierarchical tree to a topology of the data network.

3. The method according to claim 1, further comprising the step of: in the vertex node network elements updating a database of outstanding aggregation operations.

4. The method according to claim 3, wherein the database comprises a status of pending aggregation requests in the child node network elements of the vertex node network elements.

5. The method according to claim 1, further comprising the step of distributing the aggregation result from the root node network element of the hierarchical tree to all the network elements of the aggregation collective group.

6. The method according to claim 5, wherein distributing is performed by head-end replication using a reliable transport protocol.

7. The method according to claim 5, wherein distributing is performed by a reliable multicast protocol.

8. Apparatus, comprising:
a switch interconnected in a data network with a plurality of network elements, the switch configured to mediate data exchanges among the network elements;
a processor, operative for organizing the network elements into at least one hierarchical tree having a root node network element, vertex node network elements and child node network elements, the child node network elements comprising leaf node network elements,
wherein the leaf node network elements are operative for originating aggregation data and transmitting the aggregation data to respective parent vertex node network elements thereof, and
wherein the vertex node network elements are operative for combining the aggregation data from at least a portion of the child node network elements thereof; and transmitting the combined received aggregation data from the vertex node network elements to parent vertex node network elements thereof, and the root node network element is operative, when all expected aggregation data have been received thereat, for initiating a reduction operation on the aggregation data and producing an aggregation result, wherein organizing the network elements comprises:
defining multiple hierarchical trees; and
memorizing the multiple hierarchical trees,
wherein after organizing the network elements the data network, the processor is operative for performing the additional steps of:
initializing a job that requires resources of the data network; and
selecting a best matching one of the memorized multiple hierarchical trees for the job.

9. The apparatus according to claim 8, wherein organizing the network elements comprises conforming a mapping of the hierarchical tree to a topology of the data network.

10. The apparatus according to claim 8, wherein the vertex node network elements are further operative for updating a database of outstanding aggregation operations.

11. The apparatus according to claim 10, wherein the database comprises a status of pending aggregation requests in the child node network elements of the vertex node network elements.

12. The apparatus according to claim 8, wherein the root node network element is operative for distributing the aggregation result to all the network elements of an aggregation collective group.

13. Apparatus, comprising:
a switch interconnected in a data network with a plurality of network elements, the switch configured to mediate data exchanges among the network elements;
a processor, operative for organizing the network elements into at least one hierarchical tree having a root node network element, vertex node network elements and child node network elements, the child node network elements comprising leaf node network elements,
wherein the leaf node network elements are operative for originating aggregation data and transmitting the aggregation data to respective parent vertex node network elements thereof, and
wherein the vertex node network elements are operative for combining the aggregation data from at least a portion of the child node network elements thereof:
and transmitting the combined received aggregation data from the vertex node network elements to parent vertex node network elements thereof, and the root node network element is operative, when all expected aggregation data have been received thereat, for initiating a reduction operation on the aggregation data and producing an aggregation result, wherein the vertex node network elements are operative for performing respective local reduction operations on the combined received aggregation data to produce local aggregation results; and the vertex node network elements are also operative for transmitting the local aggregation results to the parent vertex node network elements thereof.

14. A method, comprising the steps of:

organizing an aggregation collective group of network elements of a data network into a hierarchical tree having a root node network element, vertex node network elements and child node network elements, the child node network elements comprising leaf node network elements;

originating aggregation data in the leaf node network elements;

iteratively performing the steps of:
(1) receiving the aggregation data from at least a portion of the child node network elements of respective parent vertex node network elements thereof; and
(2) in the vertex node network elements combining the received aggregation data from at least a portion of the child node network elements thereof; and
(3) transmitting the combined received aggregation data from the vertex node network elements to parent vertex node network elements thereof; and in the root node network element initiating, when all expected aggregation data have been received thereat, a reduction operation on the aggregation data to produce an aggregation result, the method further comprising:

performing in the vertex node network elements respective local reduction operations on the combined received aggregation data to produce local aggregation results; and transmitting the local aggregation results to the parent vertex node network elements thereof.

15. The method according to claim 14, further comprising distributing the aggregation result from the root node network element to the network elements of the aggregation collective group.

16. The method according to claim 14, wherein organizing an aggregation collective group of network elements comprises conforming a mapping of the hierarchical tree to a topology of the data network.

17. The method according to claim 14, further comprising the step of: in the vertex node network elements updating a database of outstanding aggregation operations.

18. The method according to claim 17, wherein the database comprises a status of pending aggregation requests in the child node network elements of the vertex node network elements.

19. The method according to claim 14, further comprising organizing the network elements by:

defining multiple hierarchical trees; and memorizing the multiple hierarchical trees, thereafter performing the additional steps of:

initializing a job that requires resources of the data network; and selecting a best matching one of the memorized multiple hierarchical trees for the job.

20. The method according to claim 14, wherein organizing an aggregation collective group comprises defining multiple aggregation collective groups, and thereafter performing the additional steps of:

initializing a job that requires resources of the data network; and selecting a best matching one of the multiple aggregation collective groups for the job.

\* \* \* \* \*